Dec. 20, 1949 G. VISCHULIS, JR 2,491,697
ELECTRIC WINDSHIELD WIPER MOTOR CONTROL SYSTEM
Filed Aug. 29, 1946

Inventor:
George Vischulis Jr.
By: Hinkle, Horton, Ahlberg, Hausmann & Kupper
Attorneys.

Patented Dec. 20, 1949

2,491,697

UNITED STATES PATENT OFFICE 2,491,697

ELECTRIC WINDSHIELD WIPER MOTOR CONTROL SYSTEM

George Vischulis, Jr., Chicago, Ill., assignor to Stewart-Warner Corporation, Chicago, Ill., a corporation of Virginia Application August 29, 1946, Serial No. 693,690

13 Claims. (Cl. 318—14)

This invention relates to windshield wipers and particularly to actuating mechanism therefor operated by reversible rotating driving means.

One object of the invention is to provide a new and improved windshield wiper having an oscillating wiping element adapted to be parked at a point beyond its normal range of operation so that it is parked in an out-of-the-way position.

Another object of the invention is to provide a windshield wiper of the character indicated driven by a reversible electric motor and in which the wiping element is movable through a first and normal operating range and then is moved through a longer and parking range, and in which the wiping element is automatically stopped at one limit of its movement in the parking range.

It is also an object of the invention to provide a new and improved windshield wiper actuating mechanism which includes a crank arm of variable length, the effective length of said crank arm being automatically changed in response to its direction of rotation, and the crank arm in its longer position being operative to actuate means for stopping the mechanism automatically at one limit of the range of movement of the wiping element.

Other objects and advantages of the invention will appear from the following description taken in connection with the drawings, in which.

Figure 1:
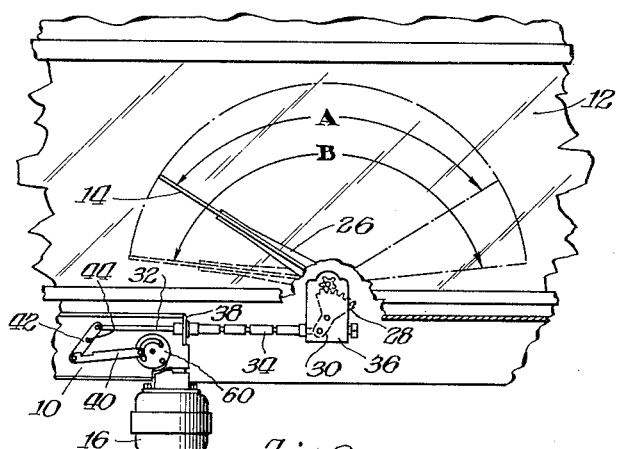
Fig. 1 is a fragmentary front elevational view showing an installed mechanism embodying this invention.

As installed for cleaning the windshield of an automobile or similar vehicle the apparatus of the present invention includes a mounting bracket 10 suitably secured below the lower edge of the windshield 12 as shown in Fig. 1. A wiping element or blade 14 of conventional construction is mounted for oscillation through a normal smaller angular range indicated by the reference character A when the driving means operates in a forward direction, and said blade is oscillated through a greater angular range B when the the driving means rotates in reverse direction. The normal range of movement is that ordinarily used for cleaning the windshield, while the greater range is such that the limits thereof are located closely adjacent the lower edge of the windshield so that when the wiping element is at one of these limits it is not in the range of vision of the driver of the vehicle. For this reason the mechanism of this invention is arranged to be automatically stopped when the wiper blade 14 is at one of the limits of its greater range of movement.

Figure 4:
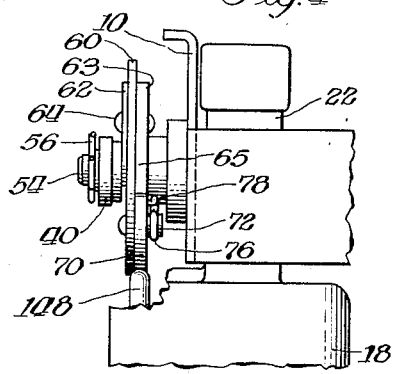
Fig. 4 is a side elevational view of the mechanism shown in Figs. 2 and 3 with some parts in section.

The reversible electric motor 16 is shown secured to the mounting bracket 10, being suspended from a switch and coupling housing portion 18 by securing bolts 20. The portion 18 preferably includes a gear housing 22 (see Fig. 4) through which a combined cam and adjustable length crank arm mechanism is rotated.

The adjustable length crank arm mechanism may be operatively connected to the windshield wiping element 14 by the mechanism illustrated in Fig. 1 which includes certain features disclosed in the co-pending application of Homer F. Malone, Serial No. 591,467, filed May 10, 1945, and assigned to the assignee of the instant application.

The wiping element 14 is mounted for oscillation upon a support 26, as shown in Fig. 1, and is operated by gearing which includes a gear segment 28 having a crank arm 30. The crank arm is actuated by a wire 32 reciprocable in a sheath 34 of special construction, as disclosed and claimed in said application of Homer F. Malone. The opposite ends of the sheath are secured, respectively, to a bracket 36 supporting the segment gear 28, and to a portion 38 of the mounting bracket 10.

The variable length crank arm mechanism is connected to the wire 32 by a pair of linkage members 40 and 42. The latter is in the nature of a lever arranged to rock about a pivot pin 44 mounted in the bracket 10. The end of the wire 32 is pivotally secured to one end of the lever 42, and the other end of the lever is pivoted to the member 40 which is in the nature of a pitman having its opposite end pivoted to the crank pin 54, preferably by a detachable fastener 56.

The crank pin 54 is carried by a rotatable member 60 driven by the motor 16 through speed reducing gearing not shown but enclosed within the housing 22. The crank pin is attached to one end of a curved arm 62 having its opposite end pivoted at 64 to the rotatable member 60. The crank pin 54 extends through a slot 66 in the member 60 which thus serves to limit the range of movement of the crank pin 54 as the arm 62 swings about its pivot 64. Preferably the arm 62 is supplemented by a similar arm 63 disposed against the opposite face of the circular rotary member 60, said arms being connected together by their common pivot 64 and by the crank pin 56 which is engaged in both of them. The member 60 thus serves to guide and steady the arms in their swinging movement about the axis of pivot 64.

Figure 2:
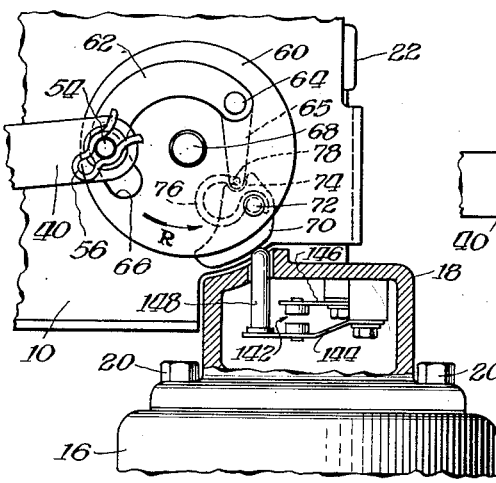
Fig. 2 is a fragmentary front elevational view of a windshield wiper actuating and control mechanism constructed in accordance with this invention, the crank pin being illustrated at its position which provides a maximum effective crank arm, this being the position of adjustment when the motor is operating in reverse direction.
Figure 3:
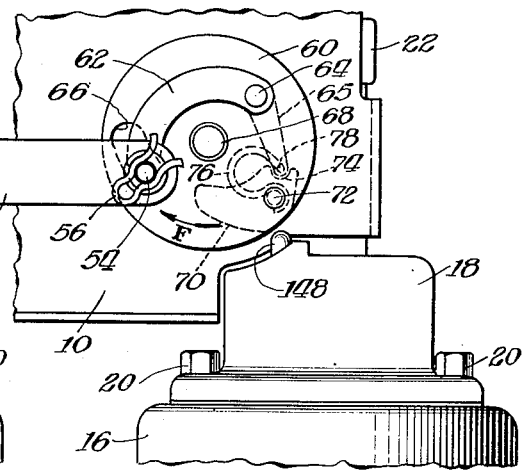
Fig. 3 is a view similar to Fig. 2, showing the crank pin positioned to provide a minimum effective crank arm which is the position of adjustment when the motor rotates in a forward direction.

Since the pivot 64 is located at a distance from the axis of the shaft 68, which is the axis of rotation of the member 60, the shifting of the crank pin 54 from one end of the slot 66 to the other end of said slot changes its distance from the axis of the shaft 68 and thus changes the effective crank arm of said crank pin 54. This alters the stroke of the pitman 40 and the resulting range of oscillation of the wiper blade 14 driven thereby. When the crank pin 54 is at the upper end of the slot 66, as viewed in Fig. 2, it provides a maximum length of crank arm which causes the wiper blade to travel through the arc B as indicated in Fig. 1; but when the crank pin 54 is adjusted to the opposite end of the slot 66, as seen in Fig. 3, it provides a crank arm of minimum length which actuates the wiper blade 14 through the smaller arc A indicated in Fig. 1.

The shifting of the crank pin 54 from one end of the slot 66 to the other end is accomplished automatically upon reversal of the motor 16. When the motor runs in what may be considered its forward direction the member 60 is rotated in the direction of the arrow F in Fig. 3, and the arm 62 swings about its pivot 64 to shift the crank pin 54 to the trailing end of the slot 66. When the motor 16 is reversed, the member 60 is rotated in the direction of the arrow R in Fig. 2, and the arm 62 swings about its pivot 64 as the crank pin 54 assumes its position at the opposite end of the slot 66. Thus, for one direction of the rotation of the motor 16 the wiper blade 14 is always driven through its shorter range A, and when the motor 16 runs in the opposite direction the wiper blade 14 will be actuated through its longer range B.

Reversal of the motor 16, however, never operates the wiper blade continuously or repeatedly through the longer range B because the blade is promptly arrested at one limit of this range by a switch mechanism about to be described. A switch 142 which opens the motor circuit is contained in the housing portion 18 as shown in Fig. 2, said switch including a pair of switch blades 144 and 146 normally biased into engagement with each other and adapted to be separated by a switch actuating pin 148 projecting slidably from the housing portion 18. The rotary member 60 carries a cam 70 attached to the member 60 by a pivot 72 and formed so that it normally lies within the circular outline of the member 60, as seen in Fig. 3; but when the member 60 operates in reverse direction the cam 70 is swung outwardly about its pivot 72 and is held in position to engage the switch actuating pin 148 for depressing it and opening the switch 142. The cam 70 is mounted at such a position on the member 60 that the switch 142 will be thus opened when the wiper blade 14 has reached one limit of its greater angular range B, thus causing the blade to be parked in a position near the lower edge of the windshield and out of the range of vision of the driver.

For thus swinging the cam 70 into operative position automatically upon reverse rotation of the member 60, the arm 63 is in the form of a lever having a rigidly extending arm 65 which engages in a notch 74 formed in the cam 70 at a distance from its pivot 72. Thus, as the arms 62 and 63 are swung through their limited range by shifting of the crank pin 56 from one end of the slot 66 to the other end of said slot, the arm 65, interengaged with the cam 70, operates to swing said cam about its pivot 72. A reverse rotation of the member 60 causes the cam 70 to be swung outwardly into operative position, while forward rotation of the member 60 causes the cam 70 to be returned to its inoperative position within the circular outline of the part 60, as shown in Fig. 3.

In this movement of the cam the end of the arm 65, which is engaged in the notch 64, swings across a line connecting the centers of the pivots 64 and 72; in other words it passes "dead center." The arm 65 and a portion of the cam 70 engaged therewith thus constitute a toggle, and the notch 74 is made deep enough to permit the parts to pass dead center as just described. Preferably the toggle is held yieldingly at either limit of its movement by the provision of a C-shaped spring 76 having one end hooked around the pivot 72 and having its opposite end bent to engage in the lever arm 65 at 78. Thus, as the end of the arm 65 approaches the pivot 72 in passing dead center, the spring 76 is required to flex slightly, causing the toggle to operate as a snap action device which not only holds the cam 72 firmly at either limit of its movement, but also tends to hold the crank pin 54 quite firmly at either end of the slot 66, avoiding any tendency of the crank pin to shift and slap against the end of the slot at either end of the stroke of the wiper blade 14 in its normal operation through the angular range A.

As shown herein the apparatus includes control means for the motor such that the motor may be selectively operated at two different speeds in a forward direction and is automatically stopped with the wiper blade 14 in parking position when the motor is conditioned for operation in a reverse direction. The wiring diagram of Fig. 5 indicates the control as effected by a manually operable multi-position switch, indicated as a whole by reference character 92 and comprising three switch blades 94, 96 and 98, all mechanically connected for simultaneous movement and movable into three circuit-controlling positions for producing reverse, slow speed forward, and fast speed forward operation of the motor 16.

In the fast speed forward position, the motor 16, which is a direct current shunt motor having an armature 100 and a shunt field 102, is operated with a reduced shunt field. The armature and shunt field are both connected to a suitable source of power such as the battery 104 and a resistor 106 is connected in series with the shunt field. One terminal of the battery is connected by conductors 108 and 110 to switch blade 94 in its fast forward speed position. The switch blade is connected by conductors 114 and 116 to the motor armature, and by conductors 114 and 118 and switch blade 96 in its fast forward speed position and conductor 120 to one terminal of the shunt field winding 102. The other terminal of the winding is connected in series with resistor 106 and to ground through conductor 124, switch blade 98, conductor 128, and conductor 130. The armature and field circuits are completed through the armature ground connection 132 and the battery ground connection 134.

In the slow speed forward position the motor is operated with full field. The armature connection remains unchanged but the field is connected directly to ground through conductor 118, switch blade 96, conductors 120 and 124, switch blade 98, and ground connection 140.

In the reverse position of the switch, the motor is operated at slow speed but in reverse direction and under the control of a parking switch 142. The energizing circuit for the motor through the parking switch is completed through conductor 150 and blades 144 and 146 of the parking switch, conductor 152, switch blade 94 in its reverse position, conductor 114 and conductor 116 leading to the armature, and conductor 118, switch blade 98 in its third position and conductor 124 leading to one terminal of the shunt field winding. The shunt field circuit is completed through conductor 120, switch blade 96 in its third position, and a ground conductor 154. It will be noted that in this reverse position the flow of current through the shunt field is in a direction opposite to that obtaining in the forward drive, with the result that the motor rotates in the reverse direction.

Figure 5:
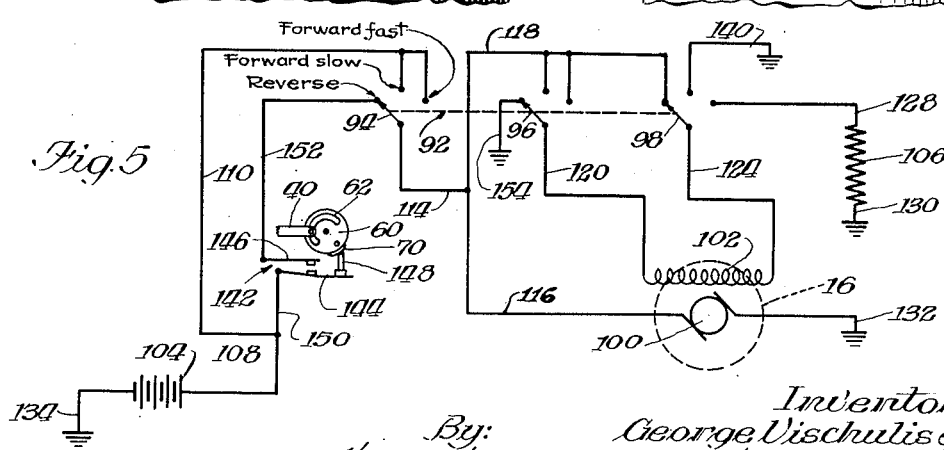
Fig. 5 is a schematic wiring diagram for the motor and control mechanism included in the apparatus.

Thus, whenever the apparatus is stopped, the wiper blade is left in the parking position and the control switch 92 stands in the reverse position with the parking switch 142 in its open position, all as indicated in Fig. 5. Then to place the apparatus in operation it is only necessary to move the switch 92 into either of its two other positions to secure slow actuation of the wiper blade 14 through its smaller arc A or to secure fast operation of the blade through this same range.

To stop the windshield wiper, the control switch 92 is shifted to its reverse position, whereupon the motor 16 reverses, causing the crank pin 54 to be shifted into the position which provides the longer effective crank arm. This shifting movement swings the lever 63 and its arm 65 in a direction to extend the cam 70 into position to encounter and depress the actuating pin 148 of the parking switch, thus stopping the motor and arresting the blade 14 in its parking position. The control circuit, shown in Fig. 5 and above described, is substantially the same as that shown in the co-pending application of Robert B. Morton, Serial No. 622,008, filed October 12, 1945, and assigned to the assignee of this application.

While there is shown and described herein but one embodiment of the present invention, it should be understood that the invention is not limited thereto or thereby but includes all modifications, variations and equivalents which may come within the scope of the appended claims.

Having thus described my invention, what I claim as new and desire to secure by Letters Patent is:

1. In a windshield wiper mechanism, a pitman, a rotary member having a crank pin to which said pitman is connected, said crank pin being adjustable on said rotary member to vary its distance from the axis of rotation of said member, a motor connected to drive said rotary member, a control switch for said motor, a cam mounted on said rotary member and adjustable thereon into and out of position for actuating said switch, and means for adjusting said cam in response to adjustments of the crank pin.

2. In a windshield wiper mechanism, a pitman, a rotary member, a crank pin connecting said pitman to the rotary member and movable on said member between limits to vary its effective crank arm and the resulting stroke of the pitman, the torque of said rotary member in one direction serving to hold said crank pin at one limit and the torque of said member in the other direction operating to shift the crank pin to its other limit, a motor connected to drive said rotary member, a control switch for said motor, a cam mounted on said rotary member and adjustable thereon into and out of position for actuating said switch, and means connecting said cam to said crank pin for adjustment in response to the shifting of the crank pin from one limit to the other.

3. In a windshield wiper mechanism, a pitman, a rotary member, a crank pin connecting said pitman to the rotary member and movable on said member between limits to vary its effective crank arm and the resulting stroke of the pitman, the torque of said rotary member in one direction serving to hold said crank pin at one limit and the torque of said member in the other direction operating to shift the crank pin to its other limit, a motor connected to drive said rotary member, a control switch for said motor, a cam mounted on said rotary member and adjustable thereon into and out of position for actuating said switch, and a lever pivoted on the rotary member and connecting said cam to the crank pin for adjusting the cam in response to movement of said crank pin from one limit to the other.

4. In a windshield wiper mechanism, a pitman, a rotary member having a crank pin to which said pitman is connected, said crank pin being adjustable on said rotary member to vary its distance from the axis of rotation of said member, a motor connected to drive said rotary member, a control switch for said motor, a cam pivoted on said rotary member for movement into and out of position for actuating said switch, and means for swinging said cam about its pivot in response to adjustments of the crank pin.

5. In a windshield wiper mechanism, a pitman, a rotary member, a crank pin to which said pitman is connected, a link supporting said crank pin and pivoted to said rotary member at a distance from the axis of rotation of said member, said link being swingable about its pivotal connection to vary the distance of said crank pin from said axis of rotation, means limiting the swing of said link, the torque of said rotary member in one direction serving to swing the link to one limit and the torque of said member in the other direction operating to swing the link to its other limit, a motor connected to drive said rotary member, a control switch for said motor, a cam mounted on said rotary member and adjustable thereon into and out of position for actuating said switch, and means connecting said cam with said link for such adjustment by the movement of the link from one limit to the other.

6. In a windshield wiper driving mechanism, a pitman, a rotary member, a crank pin connecting the pitman to said rotary member and movable on said member to vary its effective crank arm from a minimum to a maximum, the torque of said rotary member in one direction serving to hold the crank pin at its minimum effective position and the torque of said member in the reverse direction operating to shift said crank pin to its maximum effective position, a reversible motor connected to drive said rotary member, a control switch for said motor, a cam mounted on said rotary member and adjustable thereon from inoperative position to a position in which it is operative to actuate said switch, said cam being connected with said crank pin for movement to operative position when the crank pin is shifted to its said maximum effective position, and said switch being arranged to stop the motor when actuated by said cam.

7. In the combination defined in claim 6, said cam being positioned on the rotary member for engaging said switch when the pitman arrives at one limit of its reciprocating stroke.

8. In a windshield wiper driving mechanism, a pitman, a rotary member, a crank pin connecting the pitman to said rotary member and movable on said member to vary its effective crank arm from a minimum to a maximum, the torque of said rotary member in one direction serving to hold the crank pin at its minimum effective position and the torque of said member in the reverse direction operating to shift said crank pin to its maximum effective position, a reversible electric motor connected to drive said rotary member, a control switch for said motor, a cam mounted on said rotary member and adjustable thereon from inoperative position to a position in which it is operative to actuate said switch, said cam being connected with said crank pin for movement to operative position when the crank pin is shifted to its said maximum effective position, a source of electrical energy for said motor, a circuit connecting said energy source with said motor for operating the motor in one direction, a separate circuit for operating the motor in reverse direction, and a manually operable switch for connecting the motor into either circuit at will, said control switch being included in the reverse circuit and being operative to open said circuit when actuated by said cam.

9. In a windshield wiper driving mechanism, a pitman, a rotary member, a crank pin connecting the pitman to said rotary member and movable between limits on said member to vary its effective crank arm from a minimum to a maximum, a motor connected to drive said rotary member, a control switch for said motor, a cam mounted on said rotary member and adjustable thereon from inoperative position to a position in which it is operative to actuate said switch, toggle means connecting said cam with said crank pin for shifting the cam from inoperative to operative position when the crank pin moves to its maximum effective position, and spring means operative to hold the crank pin yieldingly at either limit of its movement on the rotary member.

10. In a windshield wiper driving mechanism, a pitman, a rotary member, a crank pin connecting the pitman to said rotary member and movable between limits on said member to vary its effective crank arm from a minimum to a maximum, a motor connected to drive said rotary member, a control switch for said motor, a cam mounted on said rotary member and adjustable thereon from inoperative position to a position in which it is operative to actuate said switch, and a snap-action connection for shifting said cam from inoperative to operative position in response to movement of the crank pin from one limit to the other.

11. In a windshield wiper driving mechanism, a pitman, a rotary member, a crank pin connecting the pitman to said rotary member and movable between limits on said member to vary its effective crank arm from a minimum to a maximum, a motor connected to drive said rotary member, a control switch for said motor, a cam pivotally mounted on said rotary member for movement from inoperative position to a position in which it is operative to actuate said switch, a lever pivoted on said rotary member and supporting said crank pin thereon, said lever having an arm which engages said cam at a distance from the cam pivot for shifting the cam from one position to the other in response to movement of the crank pin from one limit to the other.

12. In the combination defined in claim 9, the torque of said rotary member in either direction serving to hold the crank pin at one limit and the torque of said member upon reversal of direction operating to overcome said spring means and to shift the crank pin to its other limit.

13. In the combination defined in claim 11, said pivoted cam and the lever arm engaged therewith comprising a toggle, and spring means reacting between said arm and the pivot of the cam to hold the cam and the crank pin yieldingly at either limit of their movement.

GEORGE VISCHULIS, Jr.

REFERENCES CITED

The following references are of record in the file of this patent:

UNITED STATES PATENTS

| Number | Name | Date |
|---|---|---|
| 1,906,047 | Crichfield | Apr. 25, 1933 |

FOREIGN PATENTS

| Number | Country | Date |
|---|---|---|
| 515,965 | Great Britain | Dec. 19, 1939 |